United States Patent
Dong et al.

(10) Patent No.: US 9,210,357 B1
(45) Date of Patent: Dec. 8, 2015

(54) AUTOMATICALLY PAIRING REMOTE

(71) Applicant: Google Inc., Mountain View, CA (US)

(72) Inventors: Ke Dong, San Jose, CA (US); Yut Loy Chan, San Jose, CA (US); Sherry Qianhong Moore, Fremont, CA (US)

(73) Assignee: Google Inc., Mountain View, CA (US)

( * ) Notice: Subject to any disclaimer, the term of this patent is extended or adjusted under 35 U.S.C. 154(b) by 176 days.

(21) Appl. No.: 13/799,794

(22) Filed: Mar. 13, 2013

(51) Int. Cl.
*G05B 11/01* (2006.01)
*H04N 5/44* (2011.01)

(52) U.S. Cl.
CPC .................................. *H04N 5/4403* (2013.01)

(58) Field of Classification Search
USPC ......... 340/5.1, 10.5, 12.4, 12.5, 12.53, 13.21, 340/13.22, 13.24, 13.25, 13.26, 13.27, 340/286.01, 286.02, 539.25
See application file for complete search history.

(56) References Cited

U.S. PATENT DOCUMENTS

| | | | |
|---|---|---|---|
| 6,347,095 B1 * | 2/2002 | Tang et al. ..................... | 370/469 |
| 8,078,787 B2 * | 12/2011 | Lydon et al. .................. | 710/315 |
| 8,260,999 B2 * | 9/2012 | Ganesh et al. ................ | 710/303 |
| 8,325,020 B2 * | 12/2012 | Izadi et al. .................... | 340/10.5 |
| 8,571,494 B2 * | 10/2013 | Budianu et al. ............... | 455/102 |
| 8,611,861 B2 * | 12/2013 | Fyke et al. ..................... | 455/411 |
| 8,630,586 B2 * | 1/2014 | Dvortsov et al. ............. | 455/41.2 |
| 8,750,799 B2 * | 6/2014 | Giles et al. ................... | 455/41.2 |
| 8,762,605 B2 * | 6/2014 | Terlizzi et al. ................. | 710/62 |
| 8,830,866 B2 * | 9/2014 | Bradley et al. ................ | 370/254 |
| 8,873,523 B2 * | 10/2014 | Bradley et al. ................ | 370/338 |
| 2001/0018635 A1 * | 8/2001 | Miyasaka et al. ............. | 701/200 |
| 2003/0220765 A1 * | 11/2003 | Overy et al. ................... | 702/158 |
| 2004/0128509 A1 * | 7/2004 | Gehrmann ..................... | 713/171 |
| 2005/0005120 A1 * | 1/2005 | Kahn et al. ..................... | 713/171 |
| 2005/0125081 A1 * | 6/2005 | Ota et al. ........................ | 700/17 |
| 2005/0219211 A1 * | 10/2005 | Kotzin et al. .................. | 345/158 |
| 2005/0221858 A1 * | 10/2005 | Hoddie .......................... | 455/557 |
| 2005/0261816 A1 * | 11/2005 | DiCroce et al. ................ | 701/36 |
| 2006/0033840 A1 * | 2/2006 | Diehl et al. .................... | 348/468 |
| 2006/0083187 A1 * | 4/2006 | Dekel ............................ | 370/310 |
| 2006/0148464 A1 * | 7/2006 | Dunko et al. .................. | 455/419 |
| 2006/0240811 A1 * | 10/2006 | De Luca ..................... | 455/414.3 |
| 2007/0013550 A1 * | 1/2007 | Xie et al. ........................ | 340/901 |
| 2007/0067634 A1 * | 3/2007 | Siegler .......................... | 713/171 |
| 2007/0156853 A1 * | 7/2007 | Hipp et al. ..................... | 709/219 |
| 2007/0259674 A1 * | 11/2007 | Neef et al. .................. | 455/456.1 |

(Continued)

FOREIGN PATENT DOCUMENTS

EP          1981012 A2 *  10/2008  ............. G08C 23/04
JP       2004229307 A       8/2004

(Continued)

*Primary Examiner* — George Bugg
*Assistant Examiner* — Paul Obiniyi
(74) *Attorney, Agent, or Firm* — Lerner, David, Littenberg, Krumholz & Mentlik, LLP

(57) ABSTRACT

A remote control for a set-top box is configured to communicate with the set-top box using first and second wavelengths. In one embodiment, the remote control automatically performs Bluetooth pairing with the set-top box when the remote control is in proximity to the set-top box and the user presses a button on the remote, such as a "Power" button or other designated button. The remote control may wirelessly transmit a unique ID to the set-top box for the pairing process using the first wavelength, such as infrared. When paired, the set-top box may accept commands from the remote control transmitted using the second wavelengths, e.g., Bluetooth.

8 Claims, 4 Drawing Sheets

(56) References Cited

U.S. PATENT DOCUMENTS

| | | |
|---|---|---|
| 2008/0011827 A1* | 1/2008 | Little et al. .................... 235/380 |
| 2008/0070501 A1* | 3/2008 | Wyld ........................... 455/41.2 |
| 2008/0094184 A1* | 4/2008 | Hirtz ....................... 340/286.01 |
| 2008/0168368 A1* | 7/2008 | Louch et al. ................... 715/764 |
| 2008/0227393 A1 | 9/2008 | Tang et al. |
| 2008/0232810 A1* | 9/2008 | Lu et al. ....................... 398/112 |
| 2008/0253772 A1 | 10/2008 | Katsuyama |
| 2008/0320587 A1* | 12/2008 | Vauclair et al. ................ 726/17 |
| 2009/0015726 A1* | 1/2009 | Jitsuhara ....................... 348/734 |
| 2010/0052870 A1* | 3/2010 | King ........................ 340/286.02 |
| 2011/0212702 A1* | 9/2011 | Howard et al. ............. 455/404.2 |
| 2012/0188112 A1* | 7/2012 | Beals et al. .................... 341/176 |
| 2013/0077264 A1* | 3/2013 | Schwulst ..................... 361/748 |
| 2013/0210357 A1* | 8/2013 | Qin et al. ..................... 455/41.2 |

FOREIGN PATENT DOCUMENTS

| | | |
|---|---|---|
| JP | 2010529726 A | 8/2010 |
| JP | 2010252324 A | 11/2010 |
| JP | 2010535460 A | 11/2010 |

\* cited by examiner

AUTOMATICALLY PAIRING REMOTE

BACKGROUND

Various wireless protocols have been used to remotely control one device with another, including infrared, Bluetooth, Wi-Fi. Typically, infrared remote controls are not able to penetrate through walls or other opaque objects. Other wireless controls operating at certain other radio frequencies are able to penetrate opaque devices, e.g., some remotes permit users to control audio/video receivers even if the receiver is stored contained in a cabinet with an opaque, closed door.

Some remote controls require the user to pair the remote with the device to be controlled. For example, if a user wants to use a wireless controller to control a new game console, the console may ignore the content of signals emitted by the controller until the user presses a particular button on the console and a particular button on the controller, thus indicating the user wishes to use that controller with the console.

SUMMARY

To address these and other deficiencies, this disclosure provides for a method comprising of receiving, at a first device, user input associated with a first event code instructing a second device to perform a first function, the second device being remote from the first device, transmitting the first event code to the second device in response to the user input, and transmitting, to the second device in response to the user input and via a wireless signal within a first wavelength range, an identifier of the first device. The method may also include receiving, from the second device via a wireless signal within a second wavelength range that is different than the first wavelength range, an indication that the second device will accept event codes from the first device associated with the identifier, and transmitting, to the second device and via a wireless signal within the second wavelength range, a second event code instructing the second device to perform a second function within the second range of wavelengths.

In another embodiment of the method, the first wavelength range is within the infrared spectrum.

In a further embodiment of the method, the first wavelength range requires the first device to be at a position indicating that the user likely wants to operate the second device with the first device.

In yet another embodiment of the method, the second wavelength does not require the first device to be at a position indicating that the user likely wants to operate the second device with the first device.

In yet a further embodiment of the method, the second wavelength range consists of wavelengths used by devices in accordance with a wireless standard defined by the Institute of Electrical and Electronics Engineers ("IEEE") 802.11 standard.

In another embodiment of the method, the second device is a set-top box for outputting video signals and the first device is a remote control for the set-top box.

In a further embodiment of the method, receiving the user input comprises detecting that a user has pressed a component on the surface of the first device that identifies the first function.

In yet another embodiment of the method, the component on the surface of the first device is a power button.

This disclosure also provides for a device comprising a processor configured to execute instructions and a memory storing instructions accessible by the processor.

The instructions may include receiving an infrared wireless signal associated with a command to perform a first action, initiating performance of the first action, receiving an infrared wireless signal associated with a remote identifier, wherein the remote identifier identifies a remote control and distinguishes the remote control from other remote controls, and comparing the received remote identifier with a remote identifier stored in the memory. The instructions may also include providing, to the remote control, a non-infrared wireless signal indicating that the device will accept commands from the remote control, receiving, from the remote control via the non-infrared wireless signal, a command to perform a second action, and initiating performance of the second action.

In another embodiment of the device, the non-infrared wireless signal is capable of passing through materials that are substantially opaque to infrared signals.

In a further embodiment of the device, the device is a set-top box.

In yet another embodiment of the device, providing a non-infrared wireless signal indicating that the device will accept commands from the remote control comprises pairing with the remote control in accordance with a wireless standard defined by the Institute of Electrical and Electronics Engineers ("IEEE") 802.11 standard.

This disclosures also provides for another method comprising receiving, from a remote control, user input indicating a command for a set-top box to perform wherein the command is not a request for pairing, determining, in response to the command, whether the remote control has been paired with the set-top box in response to the command, and pairing the set-top box with the remote control in response to the command upon a determination that the remote control has not been paired with the set-top box. The instructions may further include performing an action in response to the command.

In another embodiment of the method, the set-top box is a first set-top box and, in response to the user input, the remote control unpairs from the first set-top box, and performs a selected pairing operation. The selected pairing operation may be selected from a plurality of pairing operations comprising airing with the first set-top box again based on the remote control not receiving a pairing request from a second set-top box within a predetermined amount of time, and pairing with a second set-top box based the remote control receiving a pairing request from the second set-top box within the predetermined amount of time.

In a further embodiment of the method, the method includes displaying an error message that the remote control is not paired with the set-top box based on the remote control not being paired with the set-top box and receiving the user input indicating the command for the set-top box to perform.

DETAILED DESCRIPTION

In one aspect, a system is provided that permits a user to easily and automatically pair a remote control with a device to be remotely controlled, such as a set-top box. When the user points the remote at the device to be controlled and presses a button in order to cause the device to perform some action (e.g., using the power button to wake the device from a sleep state), the remote emits the command via an infrared signal (e.g., a signal within the range of 950 nm+/−50 nm) that may include a unique identifier (UID) for the remote. The device may perform the commanded action. If the device has not yet been paired with the remote, the remote will pair with the device via a wireless protocol, such as IEEE 802.11b-1999 (i.e., "Bluetooth") and thereafter accept user commands sent by the remote via the wireless protocol.

Figure 1:
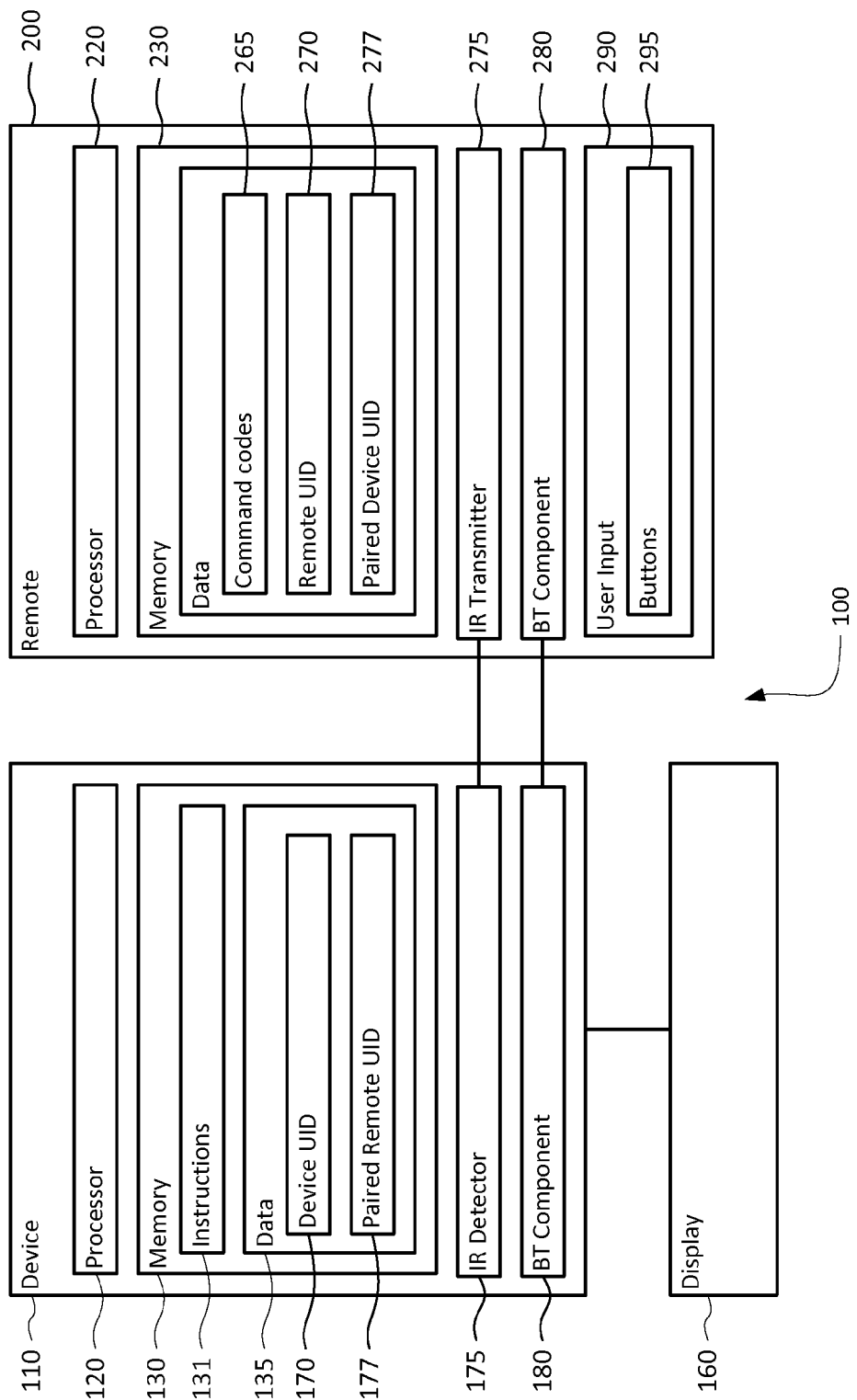
FIG. 1 illustrates an example of a system diagram of a remote control and remote-controlled device according to aspects of the disclosure.

As shown in FIG. 1, a system 100 in accordance with aspects of the disclosure may include a device 110 containing a processor 120, memory 130 and may include other components typically present in set-top boxes, consumer electronics and general purpose computers.

The memory 130 may store information accessible by processor 120, including instructions 131 that may be executed by the processor 120. The memory may also include data 135 that may be retrieved, manipulated or stored by the processor. The memory may be any type of medium capable of storing information accessible by the processor, such as a hard-drive, memory card, DVD, write-capable and read-only memories. The processor 120 may be any conventional processor, including general processing units and Reduced Instruction Set Computing ("RISC") processors. Alternatively, the processor may be a dedicated controller such as an ASIC.

The instructions 131 may be any set of instructions to be executed by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 135 may be retrieved, stored or modified by the processor 120 in accordance with the instructions 130. For instance, although the system and method is not limited by any particular data structure, the data may be stored in computer registers, in a relational database as a table having a plurality of different fields and records, XML documents, or flat files. The data may also be formatted in any computer-readable format such as, but not limited to, binary values or Unicode. The data may comprise any information sufficient to identify the relevant information, such as numbers, descriptive text, proprietary codes, pointers, references to data stored in other memories (including other network locations) or information that is used by a function to calculate the relevant data.

Although FIG. 1 functionally illustrates the processor and memory as being within the same block, the processor and memory may comprise multiple processors and memories that may or may not be stored within the same physical housing. For example, some of the instructions and data may be stored on removable media and others within a read only computer chip. Some or all of the instructions and data may be stored in a location physically remote from, yet still accessible by, the processor. Similarly, the processor may actually comprise a collection of processors which may or may not operate in parallel.

In one aspect, the device 110 is a set-top box configured to display information. By way of example, the set-top box may display video data by outputting the data to a display 160 via a display port. More particularly, the set-top box may be configured to output video signals to the display 160 via the display port. The display 160 may be any electronic device that is configured to display information, e.g., a television, a monitor having a screen, a projector, a touch-screen or a small LCD screen. Although several of the examples below are particularly applicable to set-top boxes and televisions, the device 110 may be any device capable of being operated by remote control. For example, the device may be a remote-controlled vehicle.

A remote control 200 may be used to operate the device 110. As with device 110, the remote control 200 may include a processor 220, instructions and memory.

Figure 2:
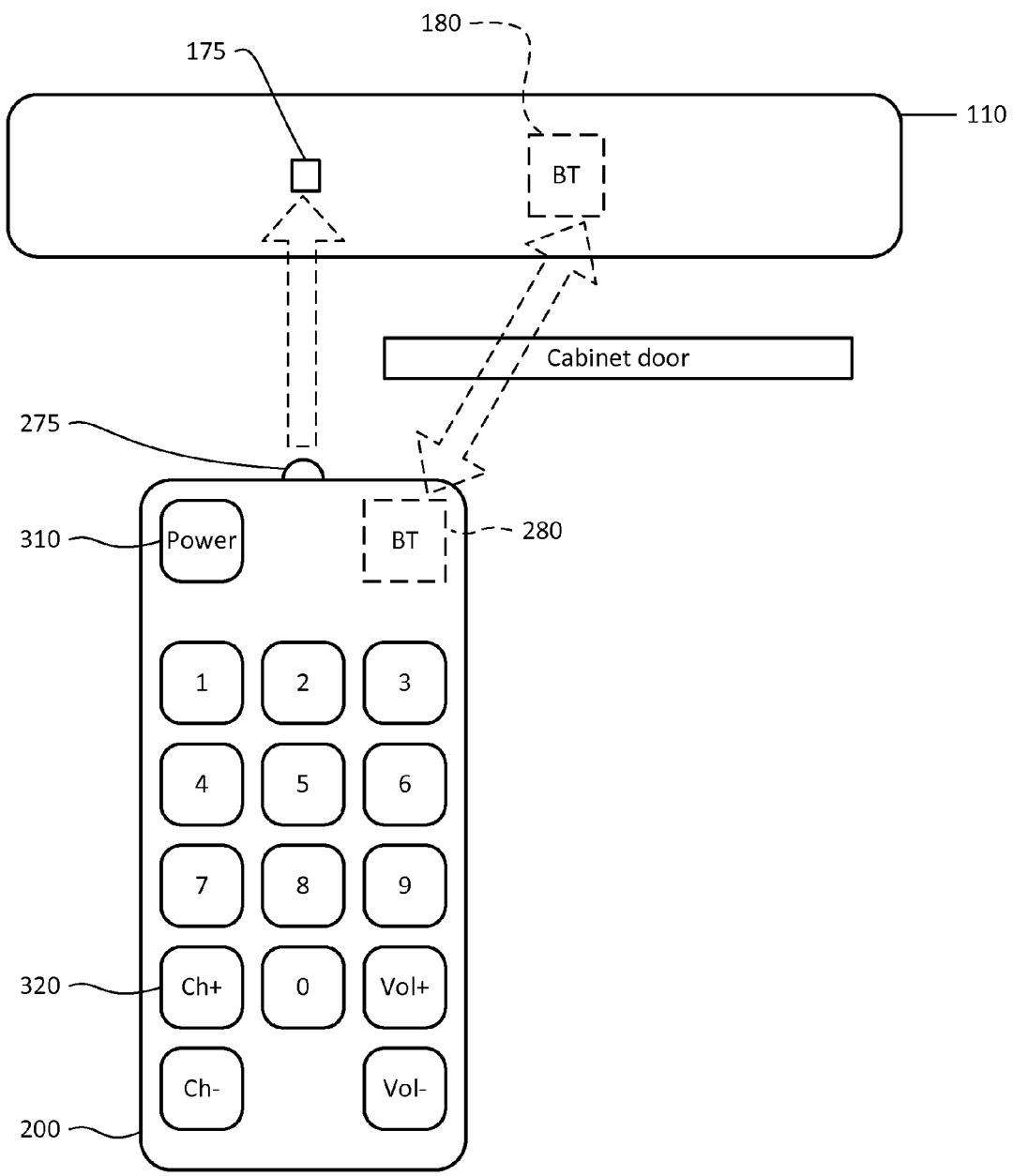
FIG. 2 illustrates an example of a diagram of a remote control in communication with a remote-controlled device according to aspects of the disclosure.
Figure 3:
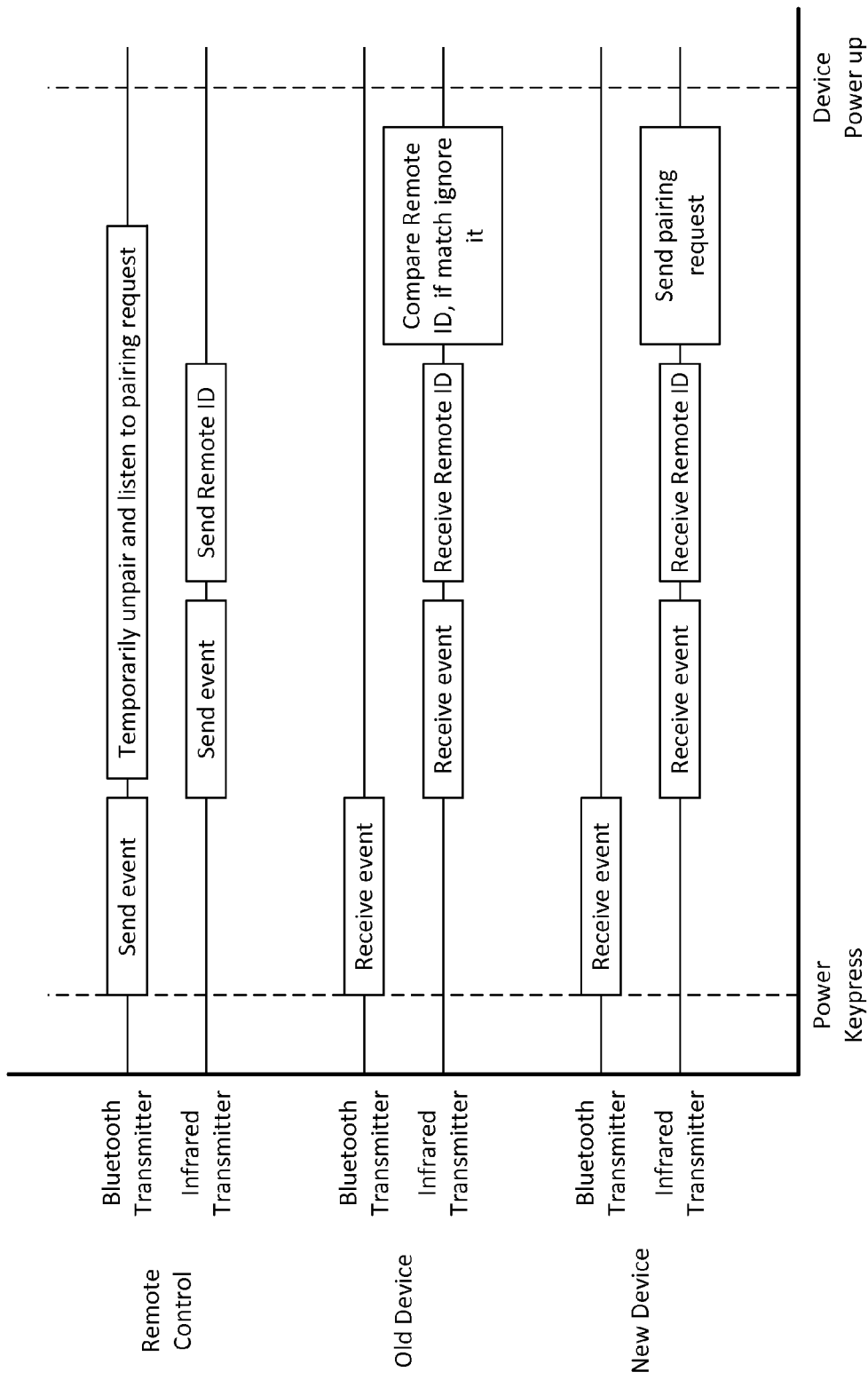
FIG. 3 illustrates an example of a timing diagram of a remote control pairing with a new remote-controlled device according to aspects of the disclosure.
Figure 4:
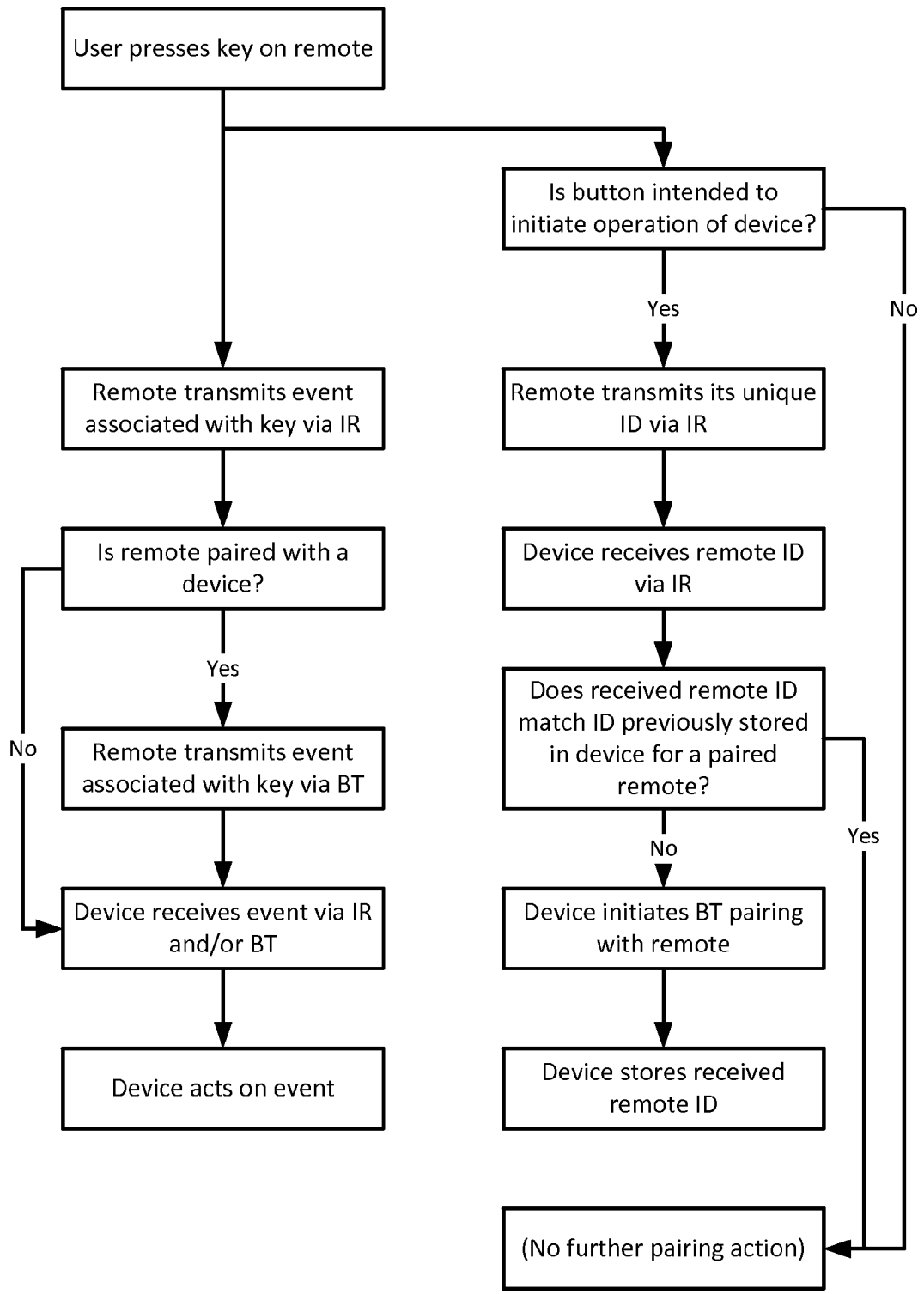
FIG. 4 illustrates an example of logic flow for pairing the remote control with a new remote-controlled device according to aspects of the disclosure.

Referring to FIG. 2, the remote control 200 may further include one or more user input components 290, such as buttons 295. The remote control 200 may include other user input components, such as a directional pad, touch screen, and other such components. In one embodiment, the input components 290 may be located on one or more surfaces of the remote control 200, and a user may activate a component by pressing on a component located on a surface of the remote control 200.

In one embodiment, the remote control 200 may include a first wireless transmitter, where the first wireless transmitter provides information via a signal that is intended to be received when the remote control 200 is at a position indicating that the user likely wants to operate the device with the remote control 200. In other words, the first wireless transmitter may transmit its signal regardless of the position of the remote control 200, but one or more of the positions of the remote control 200 may be predetermined such that, when the remote control 200 is in one of those predetermined positions, the transmitted signal is received by the device controllable by the remote control 200. In this manner, when the remote control 200 is placed into one or more of the predetermined positions, this placement may indicate that the user likely wants to operate the device controllable by the remote control 200.

By way of example, the remote control 200 may include an infrared transmitter 275. The infrared transmitter 275 may be controlled by processor 220, and may transmit information by turning an infrared LED (not shown) on and off in one or more predefined sequences. The infrared transmitter 275 may be disposed on the housing of the remote control 200 such that the user is expected to point the remote control 200 at a device in order to reliably insure that the device is capable of receiving events generated by the remote control 200, such as commands sent in response to user pressing a button. In that regard, a device 110 may include an infrared detector 175 that is capable of detecting infrared signals generated by the remote control 200.

The memory 230 of the remote control 200 may identify functions to be performed by the device 100. For example, the memory 230 may contain a table of command codes 265, where the table 265 associates each function with an individual identifier to be transmitted via the infrared transmitter 275. Each function may be further associated with one or more particular buttons. For instance, the table 265 may associate a "Power" function with the binary number 0001, and the "Power" function may be associated a power button 310 shown in FIG. 2. Similarly, the table 265 may associate a "Channel Up" function with the binary number 1010, and further associate the "Channel Up" function with a channel up button 320.

The remote control 200 may also contain a second wireless transmitter, wherein the second transmitter is configured to transmit commands to the device 110 from positions and orientations that are intended to be less restrictive than the first wireless transmitter. By way of example, the second transmitter may transmit electromagnetic signals within a longer wavelength range than infrared signals (e.g., 0.1-100 m (HF/VHF/UHF)). By way of further example, the second transmitter may be a Bluetooth component 280 that is capable of sending and receiving signals to the device 110 in accordance with the Bluetooth protocol. In that regard, the device 110 may contain a Bluetooth component 180 that is configured to send and receive signals to and from the remote control 200 via the Bluetooth protocol. The wavelength of the second wireless transmitter may be selected to allow transmission of signals through opaque objects, such as a wood door of a cabinet containing entertainment related devices.

As shown in FIG. 1, the memory 230 of the remote control 200 may also store information that distinguishes the remote control 200 from other remotes, e.g., from other remotes of the same brand and/or model. By way of example, each remote control may store a unique identifier 270 (hereafter "Remote ID"), such as a MAC address that is unique to the Bluetooth component 280. The device 110 may similarly store information 170 (hereafter "Device ID") distinguishing that particular device from other devices.

In addition to the operations illustrated in FIGS. 1-4, an operation in accordance with a variety of aspects of the method will now be described. The following operations do not have to be performed in the precise order described below. Rather, various steps can be handled in reverse order or simultaneously.

The remote and device may be initially paired as follows, with reference to elements shown in both FIGS. 1 and 2. When a user presses a button on the remote control 200, the remote control 200 notifies device 110. For example, if the user pressed the power button 310 on the remote control 200, the processor 220 may obtain the binary code of the power event from the table 265 and flash infrared transmitter 275 in accordance with that code ("0001"). In that regard, the processor 220 may cause the infrared transmitter 275 to flash once to indicate that a command is about to be sent, wait for three lengths of a predetermined amount of time to elapse (corresponding with the first three bits of the binary code, which have a value of 0) and then flash the infrared transmitter once (corresponding with the last bit, which has a value of 1). Similarly, if the user pressed the channel up button 320, the processor 220 may cause the infrared transmitter 275 to flash once to indicate that a command is about to be sent, and then flash on and off twice in a row to emit the binary code 1010. The foregoing format used to transmit event codes via an infrared transmitter is provided for ease of illustration only; a different protocol and different type of transmitter may be used as well.

In addition to sending the event code via the first transmitter, the remote control 200 may also send information that can be used to pair the remote control 200 to the device 110 via the second transmitter. By way of example, after the infrared transmitter 275 emits the event code for "Power", the remote's processor may cause the infrared transmitter 275 to provide the Remote ID 270 to device 110. The event code and the remote control's 200 unique address are detected by device 100 via infrared detector 175. In one aspect, only certain buttons on the remote control 200, such as the power button or other buttons that must be activated before the device is operational, will transmit the Remote ID in addition the event associated with the button.

If the device 110 has not been paired with the remote control 200, the remote control 200 and the device may be paired to each other such that the device will accept commands from the second transmitter. By way of example, the remote control 200 may be paired with device 110 using the Bluetooth pairing protocol. The Bluetooth component 180 may initiate pairing based on the MAC address of the Bluetooth component 280 that was sent via infrared transmitter 275. Once paired, when a user presses one of the buttons on the remote control 200, the function identifier associated with the button may be transmitted to the device via Bluetooth component 280. In that regard, the user may operate the device without pointing the remote control 200 at the device 110. Sending commands via the second transmitter may also allow the user to operate the device 110 via the remote control 200 even when the device 110 is stored behind a closed cabinet door 350. The device 110 may process the transmitted event (e.g., actively outputting video and changing a channel) before or after the pairing.

Once paired, the device 110 may store information that identifies the remote control 200 with which it has been paired. For example, device 110 may store the Remote ID 270 in its own memory (shown in FIG. 1 as Paired Remote UID 177). The remote control 200 may similarly store a unique identifier 170 of the device 110 in its own memory 230 (shown in FIG. 1 as Paired Device UID 277).

Once paired, the remote control 200 transmits events to the paired device via the second transmitter 275. In addition to sending an event from the remote to the device via the second transmitter 275 (e.g., a Bluetooth transceiver), the event code may also be sent via the infrared transmitter. The device 110 then responds to the event as appropriate, e.g., waking from a sleep mode if the user pressed the power button on the remote control 200.

Once paired with a first device, the remote control 200 may be paired with a different device without requiring the user to affirmatively request the pairing. For example, a user may take the remote control 200 to a different room containing a different set-top box, or may replace the current device with a new device. As illustrated in the timing diagram of FIG. 3, when the power button is pressed, the remote control 200 transmits the event via the Bluetooth component 280, places the component 280 in a temporarily unpaired state, and then listens for a pairing request. The remote control 200 may be placed in the unpaired state for a predetermined amount of time, such as five seconds, thirty seconds, one minute, or any other length of time. The remote control 200 may also transmit the event via the infrared transmitter followed by the Remote ID. If the remote control 200 receives a pairing request from a new device and/or within the predetermined amount of time, the remote control 200 may pair with the new device. If not, the remote may exit the temporarily unpaired state and may maintain its existing pairing relationship. In one embodiment, maintaining the existing pairing relationship with the prior set-top box may include initiating a pairing between the prior set-top box and the remote control 200.

When the old device receives the Remote ID, the device checks whether it has been paired with that particular remote by checking the stored Paired Device ID 277. If the received Remote ID matches the stored Paired Device ID 277, the device may take no further action beyond processing the event code. If the received Remote ID does not match the stored Paired Device ID 277 (as would be the case with respect to the new device), the device automatically initiates the pairing process with the remote control 200. In this manner, the remote may be paired to a new device without requiring the user to affirmatively request the pairing, thus potentially providing a more pleasant user experience and reducing the possibility of human error.

The remote and device may be paired in different ways. For example, the Remote ID may be sent acoustically, e.g., the remote control 200 may emit a special tone that is undetectable by human ears but is detectable by the device. Rather than only sending the Remote ID when certain buttons are pressed, the Remote ID may also be sent when any button is pressed. The Remote ID may further be sent periodically, e.g., repeatedly at fixed intervals. The Remote ID may further be sent by near-field communication (NFC), e.g., the Remote ID may be sent when the remote control 200 is tapped on the device. If the device has a camera, the device may also scan for a QR code that is attached to a remote and that encodes the Remote ID. Once the QR code is detected by the device, the device may initiate the pairing sequence.

As these and other variations and combinations of the features discussed above can be utilized without departing from the subject matter as defined by the claims, the foregoing description should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A system comprising:
   a first device; and
   a second device remote from the first device, wherein the second device comprises:
   a processor configured to execute instructions;
   a first transmitter;
   a second transmitter; and
   a memory storing instructions accessible by the processor, wherein the instructions comprise:
   receiving, at the second device, user input associated with a first event code instructing the first device to perform a first function;
   transmitting the first event code to the first device in response to the user input;
   transmitting, using the first transmitter, an identifier of the second device to the first device in response to the user input and via a first wireless signal within a first frequency range;
   receiving, from the first device via a wireless signal within a second frequency range that is different than the first frequency range, an indication that the first device will accept event codes from the second device associated with the identifier; and
   transmitting, using the second transmitter,
   a second event code instructing the first device to perform a second function to the first device and via a wireless signal within the second frequency range.

2. The system of claim 1 wherein receiving the user input comprises detecting that a user has pressed a component on the surface of the first device that identifies the first function.

3. The system of claim 2 wherein the component on the surface of the first second device is a power button.

4. The system of claim 1 wherein the first device is a set-top box for outputting video signals and the second device is a remote control for the set-top box.

5. The system of claim 1 wherein the first frequency range is within the infrared spectrum.

6. The system of claim 1 wherein the first frequency range requires the second device to be at a position indicating that the user likely wants to operate the first device with the second device.

7. The system of claim 6 wherein the second frequency range does not require the second device to be at a position indicating that the user likely wants to operate the first device with the second device.

8. The system of claim 1 wherein the second frequency range consists of frequencies used by devices in accordance with a wireless standard defined by the Institute of Electrical and Electronics Engineers ("IEEE") 802.11 standard.

* * * * *